United States Patent [19]

Takimoto et al.

[11] Patent Number: 5,481,529
[45] Date of Patent: Jan. 2, 1996

[54] SCANNING PROBE MICROSCOPE FOR OBSERVING A SAMPLE SURFACE WHILE APPLYING AN AC BIAS VOLTAGE BETWEEN THE SAMPLE AND A PROBE

[75] Inventors: Kiyoshi Takimoto, Isehara; Hisaaki Kawade, Yokohama; Etsuro Kishi, Sagamihara; Koji Yano, Zama, all of Japan

[73] Assignee: Canon Kabushiki Kaisha, Tokyo, Japan

[21] Appl. No.: 195,196

[22] Filed: Feb. 14, 1994

[30] Foreign Application Priority Data

Feb. 17, 1993 [JP] Japan .................................. 5-027903
Jan. 28, 1994 [JP] Japan .................................. 6-008524

[51] Int. Cl.$^6$ ........................ G11B 9/00; H01J 37/285
[52] U.S. Cl. ...................... 369/126; 369/101; 250/306; 250/307
[58] Field of Search ...................... 369/100, 126, 369/101; 250/306, 307

[56] References Cited

U.S. PATENT DOCUMENTS

| 5,107,112 | 4/1992 | Yanagisawa et al. | 250/306 |
| 5,170,238 | 12/1992 | Sakai et al. | 307/311 |
| 5,185,572 | 2/1993 | Yagi et al. | 250/306 |
| 5,196,701 | 3/1993 | Foster et al. | 250/306 |
| 5,198,667 | 3/1993 | Glembocki et al. | 250/306 |
| 5,220,555 | 6/1993 | Yanagisawa et al. | 369/126 |
| 5,287,342 | 2/1994 | Kishi et al. | 369/126 |
| 5,319,977 | 6/1994 | Quate et al. | 250/306 |
| 5,391,871 | 2/1995 | Matsuda | 250/306 |
| 5,414,260 | 5/1995 | Takimoto et al. | 250/306 |

FOREIGN PATENT DOCUMENTS 04339202  11/1992  Japan .
 6258014   9/1994  Japan .

OTHER PUBLICATIONS

"Surface Studies by Scanning Tunneling Microscopy" by G. Binning et al., Physical Review Letters, vol. 49; No. 1, Jul. 5, 1982; pp. 57–61.

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

The present invention relates to a scanning probe microscope for observing the surface of a sample therethrough by the use of a probe including a probe, means for causing the sample and the probe to scan relative to each other, means for applying an AC voltage between the sample and the probe, and means for detecting an electric current flowing between the sample and the probe at a predetermined phase point of the AC voltage, the surface of the sample being observed on the basis of the detected electric current. The specification also discloses an information recording-reproducing apparatus using such probe microscope.

8 Claims, 8 Drawing Sheets

SCANNING PROBE MICROSCOPE FOR OBSERVING A SAMPLE SURFACE WHILE APPLYING AN AC BIAS VOLTAGE BETWEEN THE SAMPLE AND A PROBE

BACKGROUND OF THE INVENTION

1. Field of the Invention

This invention relates to a scanning probe microscope and an information recording and/or reproducing apparatus using the same.

2. Related Background Art

In recent years, a scanning tunnel microscope (hereinafter abbreviated as STM) has been developed [G. Binning et al., *Phys. Rev. Lett.*, 49, 57 (1982)] and it has become possible to observe the real spatial image of the surface of a conductor at a high resolution of atomic order irrespective of single crystal or amorphous materials. The STM utilizes the fact that a tunnel current flows when a voltage is applied between a metallic probe and the surface of a conductor and the distance therebetween is approximated to the order of 1 nm. The tunnel current is very sensitive to the distance between the two. The probe is scanned on the surface of the conductor while the distance between the two is controlled so as to keep this tunnel current constant, whereby the surface shape of the conductor is formed from the control signal of the distance. At this time, the resolution in the in-plane direction reaches the order of 0.1 nm. It has recently been reported that even the observation of the atomic images or the molecular images of rare gas atoms or organic molecules adsorbed to the surface of the conductor is possible. These results are interpreted that the STM also detects the information regarding the interaction between an electron cloud on the tip end of the probe and an electron cloud on the surface of the sample.

The STM has an advantage that it enables observation to be effected by low electric power without imparting any damage by the electric current to the sample. Further, it can be operated in the atmosphere and can be used for various materials. Therefore, its application not only to surface observation but also to wide fields is expected. For example, its application to the minute working of surfaces and high density information recording has been proposed. Furthermore, there have been developed microscopes to which the art of STM is applied and by which interactions of various types between the surface of a sample and the tip end of the probe are detected to thereby enable the state of the surface to be observed, and these, including the STM, are known generically as scanning probe microscopes.

When effecting the surface observation by the STM, a bias voltage is applied between the sample and the probe to send an electric current. Where the sample is a conductor, the bias voltage can be set to a sufficiently low voltage. However, where the sample is a semiconductor, it is necessary to set the bias voltage to a relatively high level (1–3 V) and position the Fermi level of the probe in the conduction band or the valence band of the semiconductive sample. Also when observing an organic molecule layer formed on the surface of the conductor, the bias voltage must be set such that an electron cloud resulting from the organic molecule and an electron cloud at the tip end of the probe interact. The value of this bias voltage varies depending on the interaction between the surface of the conductor and the organic molecule, but generally it is often a high voltage of 1–2 V.

Such a great bias voltage is a match for the coupling energy of molecules or solids. Also, by a DC bias voltage being applied, particularly the organic molecule layer is steadily placed in its polarized state during the STM observation. Further, in the STM, the probe and the sample are very close to each other and therefore, a very high electric field is created between the tip end of the probe and the surface of the sample by the high bias voltage. If the high bias voltage continues to be applied for a long time in case of the surface observation, the state of the surface to be observed may gradually change. The state of the tip end of the probe may also change, and there is the possibility that an accurate surface image is not formed.

Such a situation, however, is not limited to the STM, but in a recording apparatus or a reproducing apparatus utilizing the STM as well, the surface of a recording medium may be changed in its quality by recording or reproduction being repeated, and this will pose a problem in effecting stable recording or reproduction.

SUMMARY OF THE INVENTION

The present invention has been made in view of the above-noted problems and a first object thereof is the provision of a scanning probe microscope which will ensure an accurate surface image to be obtained even if a bias voltage continues to be applied between a probe and a sample for a long time.

A second object of the present invention is the provision of an information recording-reproducing apparatus which can effect stable recording or reproduction even if a bias voltage continues to be applied between a probe and a recording medium for a long time.

The first object is achieved by a scanning probe microscope for observing the surface of a sample by the use of a probe, provided with a probe, means for causing the sample and the probe to scan relative to each other, means for applying an AC voltage between the sample and the probe, and means for detecting an electric current flowing between the sample and the probe at a predetermined phase point of the AC voltage, the surface of the sample being observed On the basis of the detected electric current.

The second object is achieved by an information recording-reproducing apparatus for effecting the recording and/or reproduction of information on a recording medium by the use of a probe, provided with a probe, means for causing the recording medium and the probe to scan relative to each other, means for applying an AC voltage between the recording medium and the probe, and means for detecting an electric current flowing between the recording medium and the probe at a predetermined phase point of the AC voltage, recording bits on the recording medium being reproduced on the basis of the detected electric current.

DESCRIPTION OF THE PREFERRED EMBODIMENTS (Embodiment 1)

Figure 1:
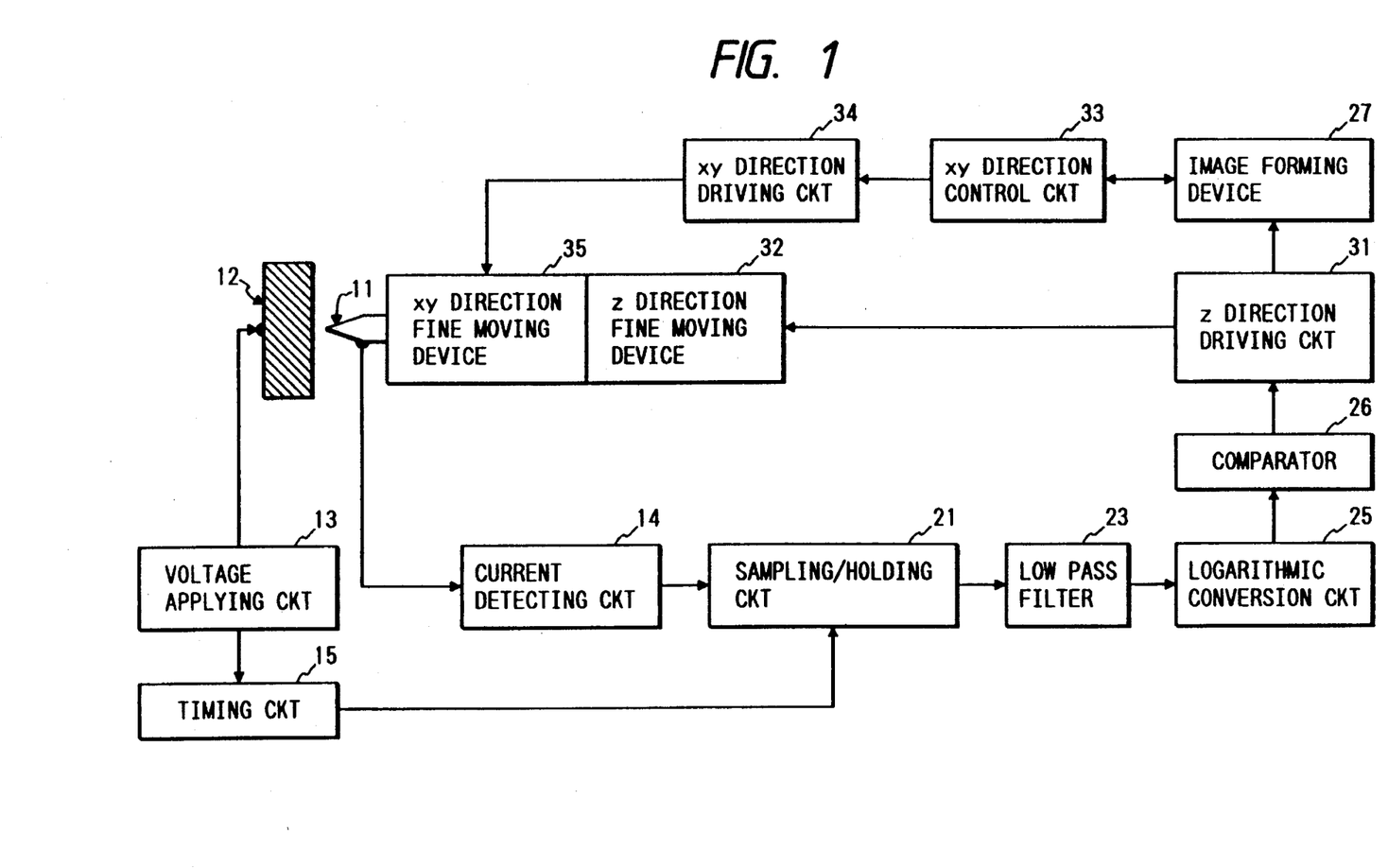
FIG. 1 diagrammatically shows a first embodiment of the scanning probe microscope of the present invention.

FIG. 1 is a block diagram of a first embodiment of the scanning probe microscope of the present invention.

In FIG. 1, the reference numeral 11 designates a probe (electrode), the reference numeral 12 denotes a sample which is the object of observation, the reference numeral 13 designates a voltage applying circuit for applying a bias voltage between the probe 11 and the sample 12, the reference numeral 14 denotes a current detecting circuit for detecting an electric current flowing between the probe 11 and the surface of the sample 12, the reference numeral 15 designates a timing circuit for giving the timing for sampling the detected electric current signal, the reference numeral 21 denotes a sampling/holding circuit for sampling and holding the electric current detection signal on the basis of the timing signal, and the reference numeral 23 designates a low pass filter which outputs a component of a designated cut-off frequency or below. The reference numeral 25 denotes a logarithmic conversion circuit, and the reference numeral 26 designates a comparator for outputting the difference signal between a logarithmically converted input and a reference current value. The reference numeral 31 denotes a z direction driving circuit for outputting a signal to drive a z direction fine moving device 32 by the difference signal, the reference numeral 32 designates a z direction fine moving device for changing the distance between the surface of the sample 12 and the probe 11, and the reference numeral 33 denotes an xy direction control circuit for inputting an xy scanning signal to an xy direction fine moving device 35 through an xy direction driving circuit 34. The reference numeral 35 designates an xy direction fine moving device for finely moving the probe 11 in xy direction in the plane of the sample. The reference numeral 27 denotes an image forming device for imaging the output signal of the z direction driving circuit 31 as the shape of the surface of the sample by the output of the xy direction control circuit 33 in synchronism with the movement of the probe 11 in xy direction.

The operation of the present embodiment will now be described. The probe 11 provided in opposed relationship with the sample 12 can be moved by minute amounts in x, y and z axis directions by the z direction fine moving device 32 and the xy direction fine moving device 35. A bias voltage is applied between the probe 11 and the sample 12 by the voltage applying circuit 13, an electric current flowing between the probe 11 and the sample 12 is detected by the current detecting circuit 14, and the distance between the tip end of the probe 11 and the surface of the sample 12 is feedback-controlled by the z direction fine moving device 32 so as to keep the electric current constant. The probe 11 is driven on the surface of the sample 12 by the xy direction fine moving device 35 in accordance with the output of the xy direction control circuit 33 while this feedback control is effected. Imaging is effected by the control signal of the z direction driving circuit 31 by the use of the image forming device 27 in synchronism with the movement of the probe 11 in xy direction, whereby the shape of the surface of the sample can be known.

Figure 2A:
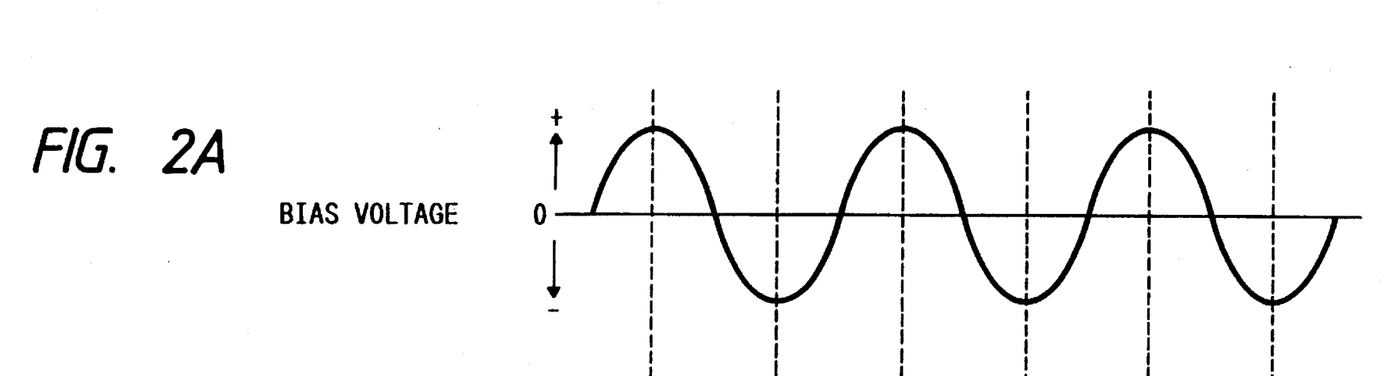
FIGS. 2A and 2B show the waveform of a bias voltage during the operation of the construction shown in FIG. 1 and the timing signal of a sampling/holding circuit.
Figure 2B:
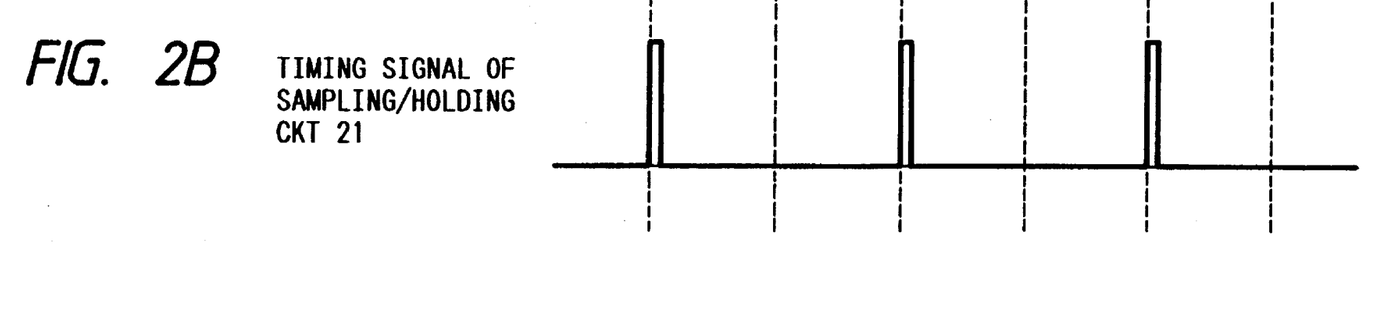

The voltage applying circuit 13 outputs an AC voltage of which the DC component is 0 V. A timing signal is outputted by the timing circuit 15 at a predetermined phase point designated in synchronism with the output of the voltage applying circuit 13 (FIGS. 2A and 2B). The current signal detected by the current detecting circuit 14 is sampled relative to the same bias voltage by the sampling/holding circuit 21 in accordance with the aforementioned timing signal. A component of a cut-off frequency designated by the low pass filter 23 or below is extracted from the sampled current signal. The sampled signal is logarithmically converted by the logarithmic conversion circuit 25, whereafter the difference thereof from a reference current value is taken out by the comparator 26. The z direction fine moving device 32 is driven by the z direction driving circuit 31 so as to compensate for this difference signal, and the distance between the tip end of the probe 11 and the surface of the sample 12 is feedback-controlled. At the same time, the output of the z direction driving circuit 31 is used as a signal for imaging the shape of the surface of the sample.

The bias voltage need be an AC voltage of a frequency sufficiently higher than the cut-off frequency of the low pass filter 23. By such setting, the fluctuation component of the electric current by the fluctuation of the bias voltage is not included in the control signal of the z direction fine moving device, and the probe 11 is not vibrated in z direction at the fluctuation frequency of the bias voltage, and the shape of the surface of the sample being observed is not affected by the fluctuation frequency component of such bias voltage.

It is preferable that the cut-off frequency of the low pass filter 23 be set to the order of the spatial frequency of the shape of the surface of the sample being observed that is found from the scanning frequency of the probe 11 and the resolution necessary for the observation. For example, to scan the probe at 100 Hz and obtain an observation image by 500 pixels per scanning line, the cut-off frequency can be set to the order of 50 kHz. At this time, the frequency of the bias voltage should preferably be the order of 500 kHz or higher. The sampling of the current signal is also effected at the same frequency as the frequency of the bias voltage. By the observation of the surface of the sample by the STM being effected by the present embodiment, the time for which the high voltage is applied can be shortened even when the bias voltage during the observation is relatively high, and the time integration over one cycle of the applied AC voltage is 0 and therefore, the surface of the sample can be averagely kept free of polarization and thus, long-time observation can be effected as compared with the observation by the application of a DC bias voltage.

(Embodiment 2)

Figure 3:
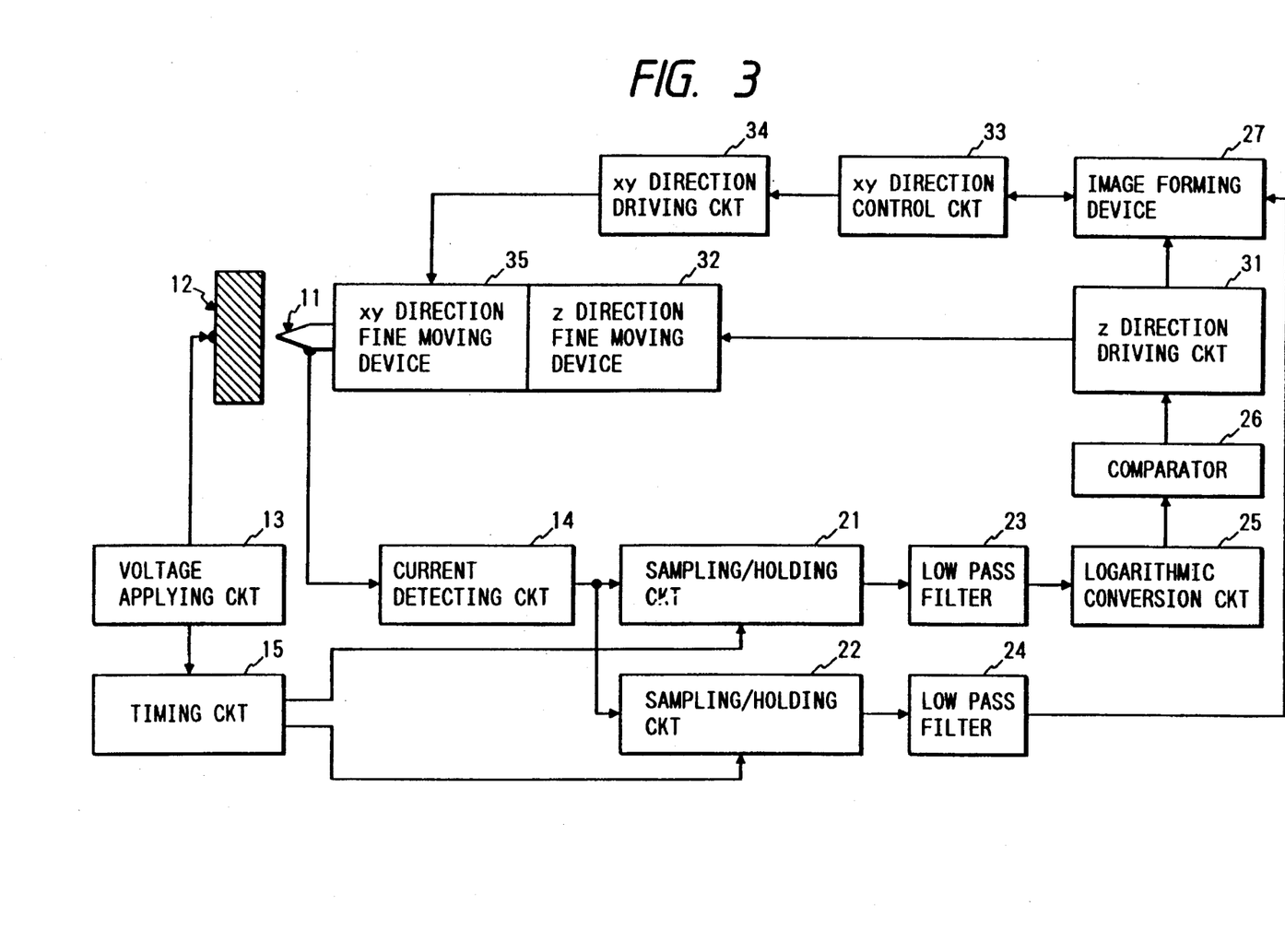
FIG. 3 diagrammatically shows a second embodiment of the scanning probe microscope of the present invention.

In contrast with the apparatus of Embodiment 1, as shown in FIG. 3, a sampling/holding circuit 22 and a low pass filter 24 discrete from the sampling/holding circuit 21 and low pass filter 23 for feedback-controlling the distance between the tip end of the probe 11 and the surface of the sample 12 are additionally provided in this embodiment. A current signal is sampled and taken out as an observation signal by a timing signal (FIG. 4C) synchronized with an AC bias voltage by the timing circuit 15 and produced at a phase point discrete from that of a timing signal (FIG. 4B) for controlling the sampling/holding circuit 21, and the current signal is transformed into an image by the image forming device 27 in synchronism with the movement of the probe 11 in xy direction. By the present embodiment, the distance between the tip end of the probe 11 and the surface of the sample 12 can be feedback-controlled so that an electric current under a certain bias voltage may be maintained constant, and the image of the shape of the surface of the sample can be formed by that control signal and also, an image by a current value under another bias voltage can be obtained at the same time while this feedback control is effected. Thereby, the imaging of a distribution of an amount corresponding to the ease with which the electric current flows in the surface of the sample can be effected simultaneously with the observation of the shape of the surface of the sample. Also, the imaging of the distribution of electric conductivity at 0 V which was difficult under DC bias can be effected.

The additionally provided sampling/holding circuit 22 and low pass filter 24 may be a plurality of sets.

Also, the sampling/holding circuit 21 may be one which samples respective electric currents at a plurality of different phase points in accordance with the timing signal from the timing circuit 15. In this case, the current signal sampled at one phase point is used as a signal for the feedback control of the STM, i.e., the observation of the shape, and the current signal sampled at the other phase point is used as a signal for the current image observed at the same time.

The techniques in the above-described Embodiments 1 and 2 are also applicable to a recording-reproducing apparatus in which the distance between a probe and a sample (recording medium) is controlled and yet a voltage pulse is applied by a voltage generating circuit for forming recording bits while the surface of the sample is scanned, whereby modulation is caused in the shape or electron state of the surface of the sample by a tunnel current, a field emission current, a contact current or the like to thereby form recording bits. Thereby, the techniques can be utilized to eliminate the influence of the bias voltage upon the recording medium when the probe is scanned on the surface of the recording medium during recording or reproduction, and stable recording or reproduction can be accomplished.

Figure 7:
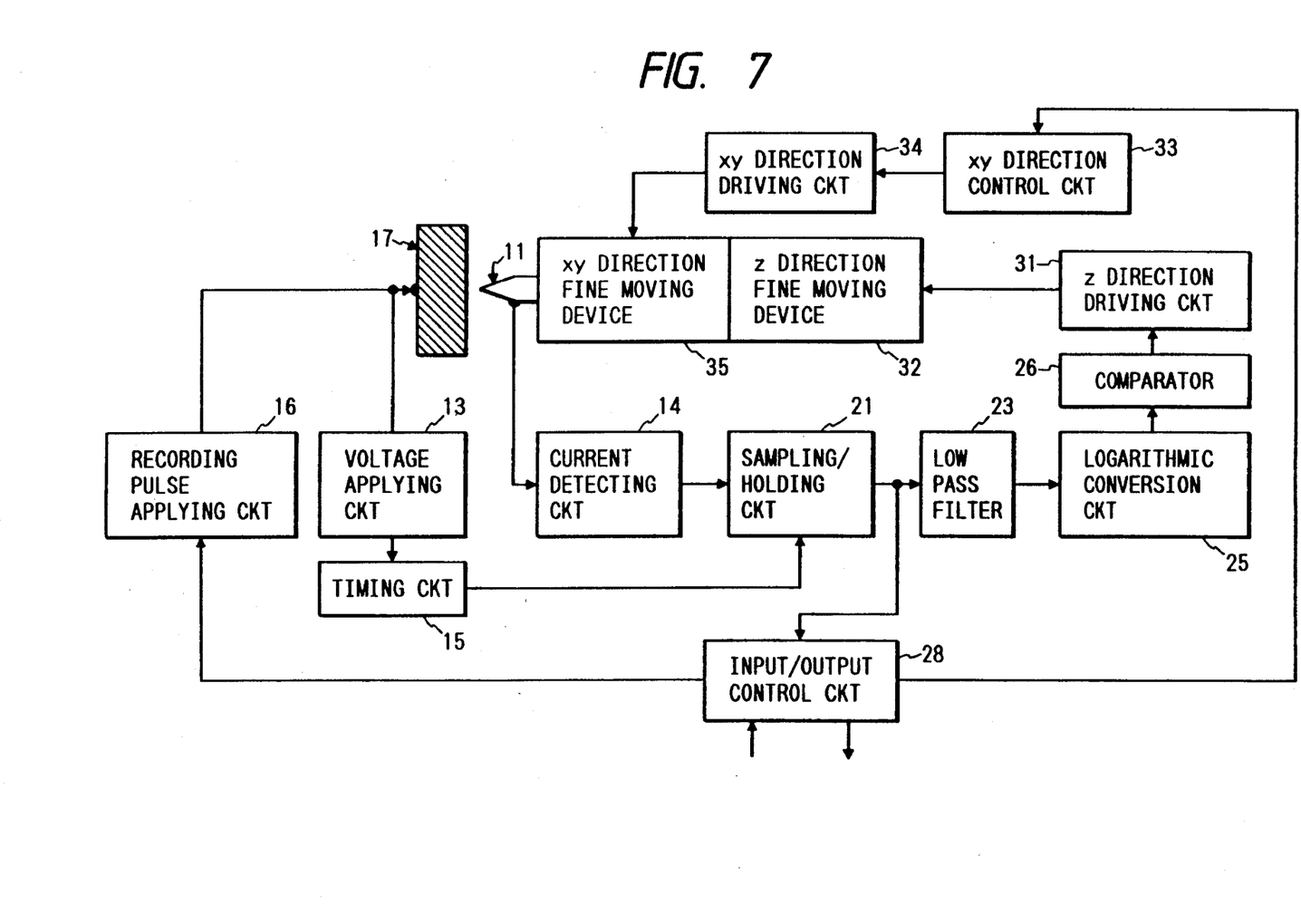
FIG. 7 is a block diagram showing an embodiment of the recording-reproducing apparatus of the present invention.

FIG. 7 is a block diagram showing a recording-reproducing apparatus to which the technique of the above-described Embodiment 1 is applied.

As in the above-described Embodiment 1, an AC voltage (FIG. 2A) of which the DC component is 0 V is applied as a bias voltage between the probe 11 and a recording medium 17 by the voltage applying circuit 13, and an electric current flowing between the tip end of the probe 11 and the surface of the recording medium 17 is sampled at a predetermined phase point designated in synchronism with the output of the voltage applying circuit 13, and this sampled signal is used to feedback-control the distance between the tip end of the probe 11 and the surface of the recording medium 17.

In FIG. 7, the reference numeral 28 designates an input/output control circuit which controls an xy direction control circuit 33 and a recording pulse applying circuit 16 in accordance with an information bit row to be inputted, to thereby move the probe 11 to a predetermined location on the surface of the recording medium 17, and applies a recording pulse between the probe 11 and the recording medium 17 and executes the recording of information. Further, the input/output control circuit 28 controls the xy direction control circuit 33, moves the probe 11 to a predetermined location on the surface of the recording medium 17, converts the output of the sampling/holding circuit 21 at respective locations, i.e., the electric current flowing between the recording medium 17 and the probe 11, into a reproducing bit row and outputs a reproduction signal.

The voltage pulse for recording may be superposed upon the bias voltage and applied between the probe 11 and the recording medium 17.

Figure 8:
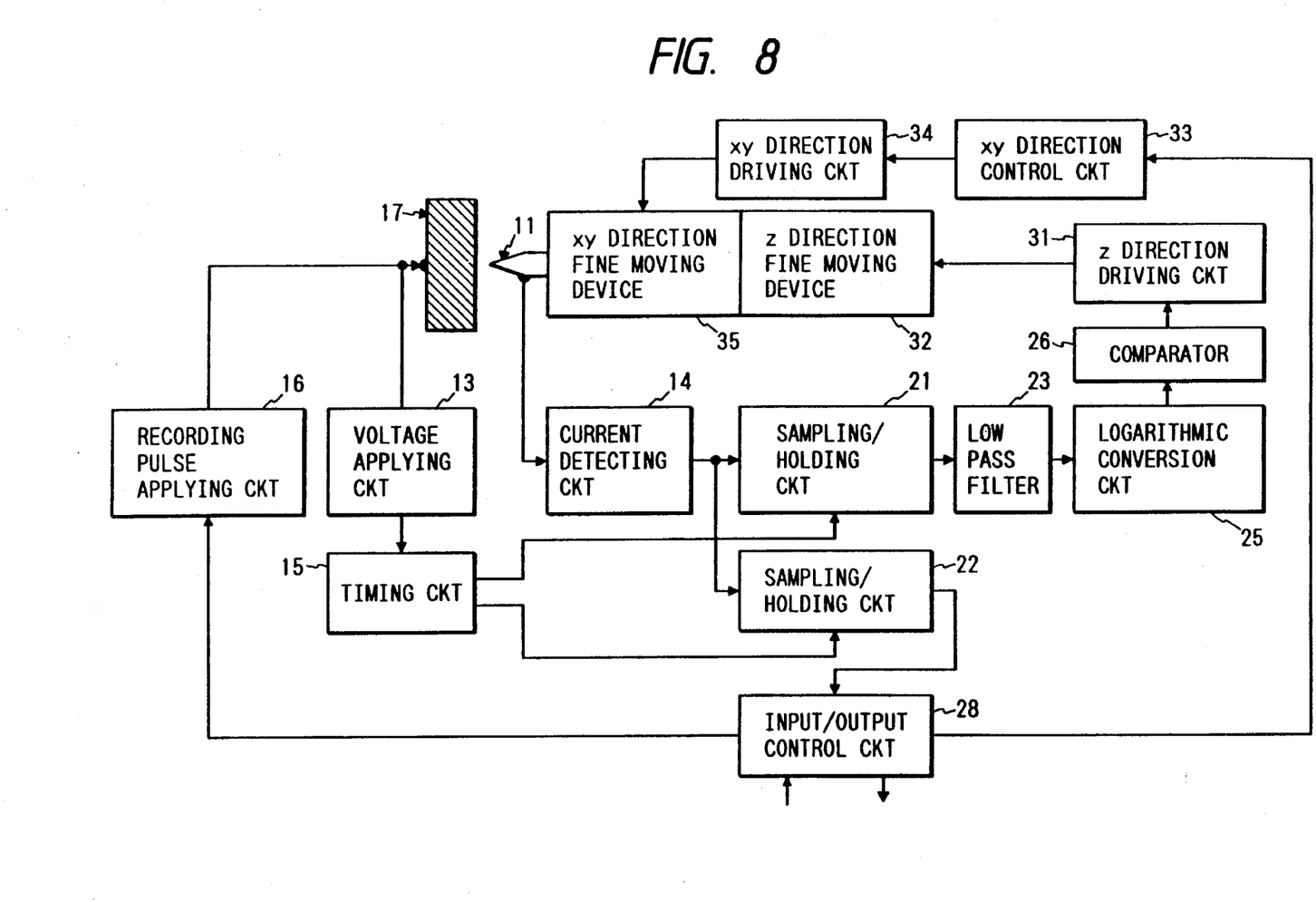
FIG. 8 is a block diagram showing another embodiment of the recording-reproducing apparatus of the present invention.

Further, as in the above-described Embodiment 2, a sampling/holding circuit 22 may be provided discretely from the sampling/holding circuit 21 for feedback-controlling the distance between the tip end of the probe 11 and the surface of the recording medium, and in synchronism with the AC bias voltage, the current signal may be sampled at a phase point discrete from the sampling/holding circuit 21, and a reproduction signal may be provided by this sampling signal (FIG. 8).

Figure 4A:
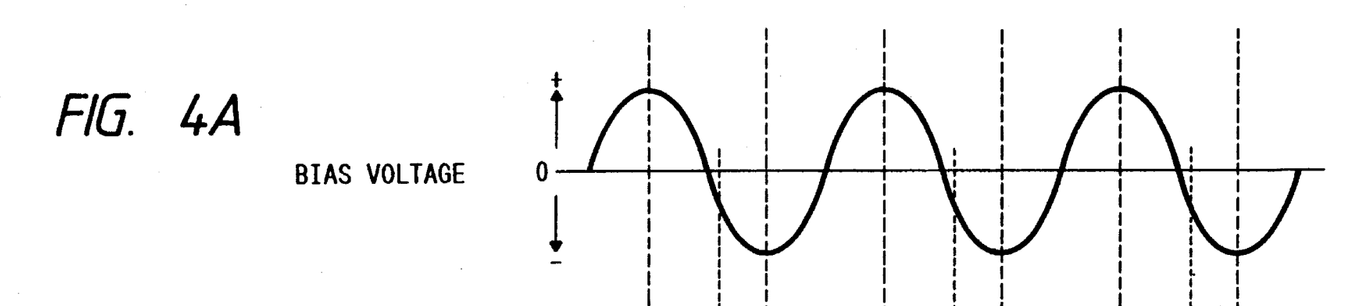
FIG. 4A shows the waveform of a bias voltage during the operation of the construction shown in FIG. 3, and FIGS. 4B and 4C show the timing signals of a sampling/holding circuit.
Figure 4B:
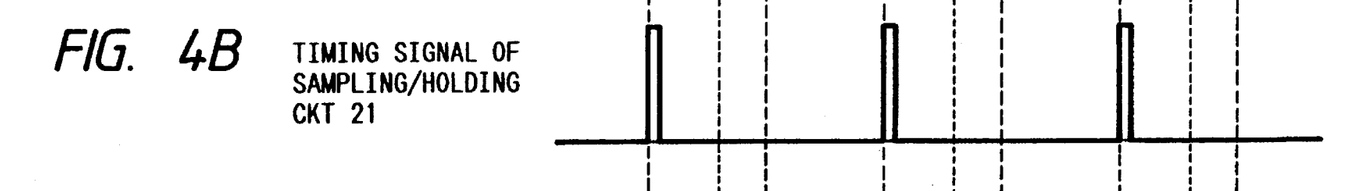
Figure 4C:
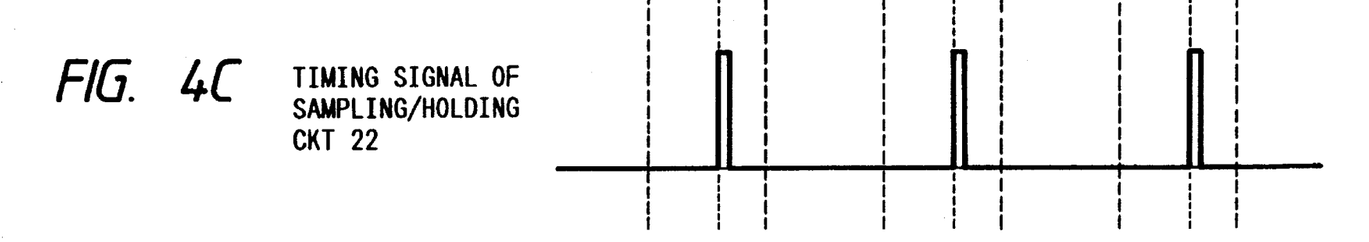
Figure 5A:
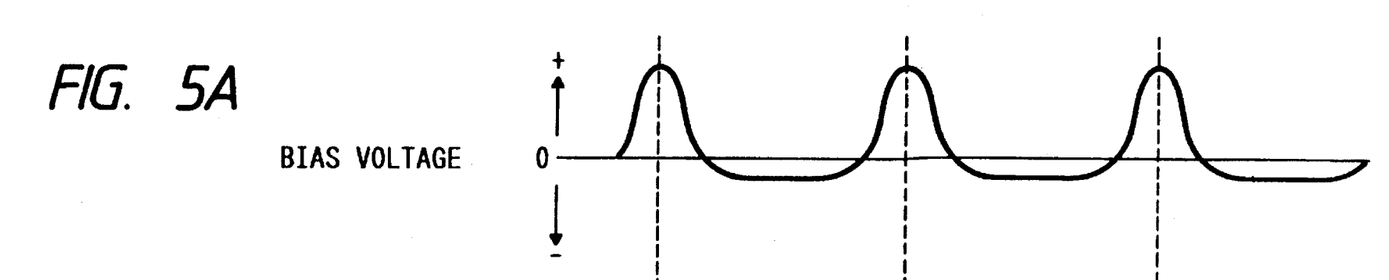
FIGS. 5A and 5B show other forms of the waveform of the bias voltage and the timing signal of the sampling/holding circuit shown in FIG. 2.
Figure 5B:
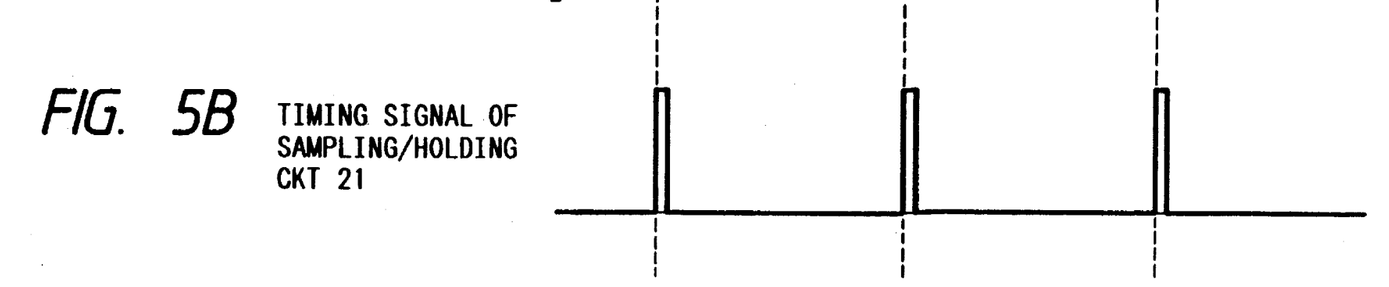
Figure 6A:
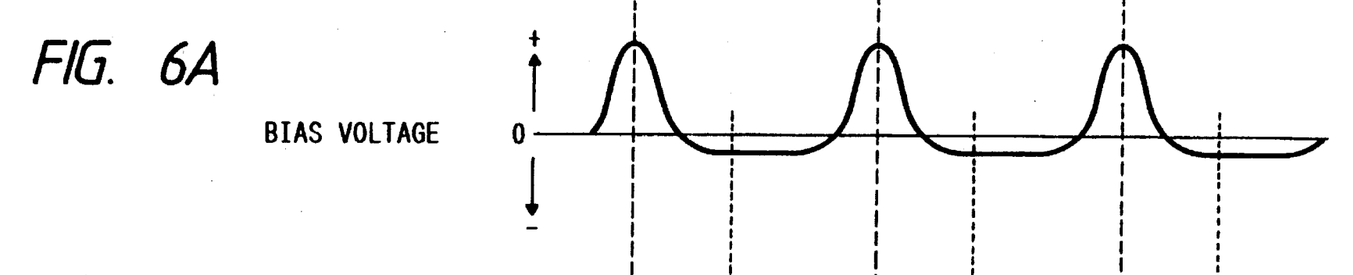
FIGS. 6A, 6B and 6C show other forms of the waveform of the bias voltage and the timing signals of the sampling/holding circuit shown in FIG. 4.
Figure 6B:
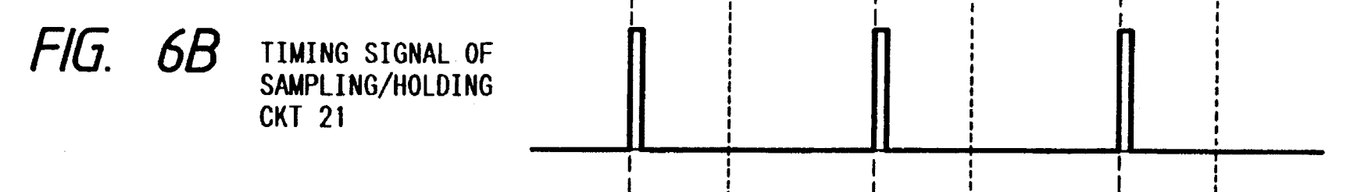
Figure 6C:
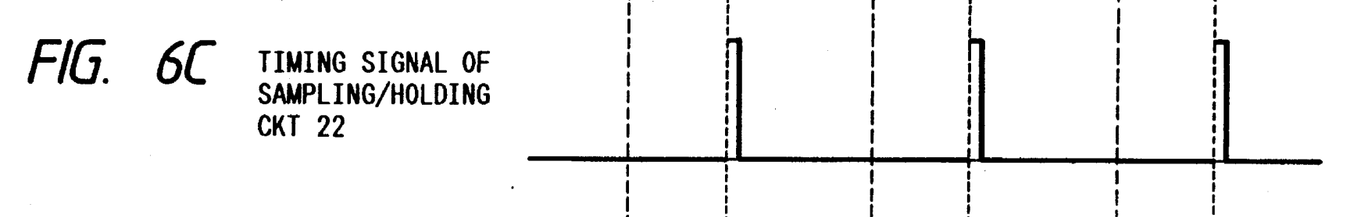

In each of the above-described embodiments, the voltage applying circuit 13 outputs an AC voltage of symmetrical waveform (point-symmetrical with respect to a zero cross point) as shown in FIGS. 2A and 4A. However, the waveform of the AC voltage may be asymmetrical as shown in FIGS. 5A and 6A. In this case, if the peak of the waveform of one polarity of the AC voltage is made sufficiently small relative to the peak of the waveform of the other polarity so that the time integration of one cycle may be 0, the time for which the high voltage is applied is only the time of one polarity and therefore, the time for which the high voltage is applied can be further decreased.

FIG. 5A shows an example in which the waveform of FIG. 2A is made asymmetrical, and FIG. 6A shows an example in which the waveform of FIG. 4A is made asymmetrical. Incidentally, even if the waveform of the AC voltage is made into an asymmetrical waveform, there will occur no change in the operation of the constructions shown in FIGS. 1 and 3.

What is claimed is:

1. A scanning probe microscope for observing a surface of a sample while applying a voltage between a probe and the sample, including:

a probe;

scanning means for causing said sample and said probe to scan relative to each other;

means for applying an AC bias voltage between said sample and said probe when the relative scanning between said probe and said sample is effected by said scanning means; and means for detecting an electric current flowing between said sample and said probe at a predetermined phase point of said AC bias voltage;

the surface of said sample being observed on the basis of said detected electric current.

2. A scanning probe microscope according to claim 1, wherein the DC component of said AC voltage is 0 V.

3. A scanning probe microscope according to claim 1, wherein the waveform of said AC voltage is asymmetrical.

4. A scanning probe microscope according to claim 1, wherein the frequency of said AC voltage is set on the basis of the scanning frequency of said scanning means and the resolution of observation.

5. An information recording-reproducing apparatus utilizing the principle of a scanning probe microscope for observing a surface of a sample while applying a voltage between a probe and the sample so as to effect recording and/or reproduction of information on/from a recording medium corresponding to the sample, including:

a probe;

scanning means for causing said recording medium and said probe to scan relative to each other;

means for applying an AC bias voltage between said recording medium and said probe when the relative scanning between said recording medium and said probe is effected by said scanning means; and means for detecting an electric current flowing between said recording medium and said probe at a predetermined phase point of said AC bias voltage;

recording bits on said recording medium being reproduced on the basis of said detected electric current.

6. An information recording-reproducing apparatus according to claim 5, wherein the DC component of said AC voltage is 0 V.

7. An information recording-reproducing apparatus according to claim 5, wherein the waveform of said AC voltage is asymmetrical.

8. An information recording-reproducing apparatus to claim 5, wherein the frequency of said AC voltage is set on the basis of the scanning frequency of said scanning means and the resolution of reproduction.

* * * * *

UNITED STATES PATENT AND TRADEMARK OFFICE
CERTIFICATE OF CORRECTION

PATENT NO. : 5,481,529

DATED : January 2, 1996

INVENTORS : KIYOSHI TAKIMOTO ET AL.   Page 1 of 2

It is certified that error appears in the above-identified patent and that said Letters Patent is hereby corrected as shown below:

ON THE TITLE PAGE:

[56] Foreign Patent Documents

"04339202  11/1992, Japan, 6258014  9/1994  Japan" should read 4-339202  11/1992, Japan  6-258014 9/1994 Japan--.

COLUMN 2

Line 41, "On" should read --on--.

COLUMN 3

Line 33, "component of" should read --component at or below --;
Line 34, delete "or below".

UNITED STATES PATENT AND TRADEMARK OFFICE
CERTIFICATE OF CORRECTION

PATENT NO. : 5,481,529

DATED : January 2, 1996

INVENTORS : KIYOSHI TAKIMOTO ET AL.

It is certified that error appears in the above-identified patent and that said Letters Patent is hereby corrected as shown below:

<u>COLUMN 8</u>

Line 7, "apparatus" should read --apparatus according--.

Signed and Sealed this

Twenty-third Day of July, 1996

Attest:

BRUCE LEHMAN

Attesting Officer   Commissioner of Patents and Trademarks